United States Patent
Li et al.

(10) Patent No.: US 11,831,215 B2
(45) Date of Patent: Nov. 28, 2023

(54) LINEAR VIBRATION MOTOR

(71) Applicant: AAC Microtech (Changzhou) Co., Ltd., Changzhou (CN)

(72) Inventors: Ziang Li, Shenzhen (CN); Yan Shao, Shenzhen (CN); Zhiyong Cui, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 210 days.

(21) Appl. No.: 17/541,286

(22) Filed: Dec. 3, 2021

(65) Prior Publication Data

US 2022/0360156 A1  Nov. 10, 2022

(30) Foreign Application Priority Data

May 6, 2021 (CN) .......................... 202120953178.3

(51) Int. Cl.
*H02K 33/10* (2006.01)

(52) U.S. Cl.
CPC .................................. *H02K 33/10* (2013.01)

(58) Field of Classification Search
CPC ........ H02K 35/00; H02K 35/02; H02K 35/04; H02K 35/06; H02K 33/00; H02K 33/02; H02K 33/10; H02K 33/16
USPC .. 310/4, 15–29, 12, 81, 80, 321, 20, 21, 25, 310/28–30, 36–37, 40 MM
See application file for complete search history.

(56) References Cited

U.S. PATENT DOCUMENTS

| | | | | |
|---|---|---|---|---|
| 2,789,177 A | * | 4/1957 | Brockway | H01H 50/76 335/93 |
| 3,400,316 A | * | 9/1968 | Kuschel | H02K 33/02 327/461 |
| 3,501,745 A | * | 3/1970 | Beckman | H01H 51/32 361/207 |
| 3,602,842 A | * | 8/1971 | Smith | G04C 3/10 318/128 |
| 3,609,419 A | * | 9/1971 | Greuter | G04B 17/045 968/126 |
| 4,154,559 A | * | 5/1979 | Enomoto | F04B 45/047 417/413.1 |
| 4,290,489 A | * | 9/1981 | Leavell | F04B 39/12 173/133 |
| 4,313,417 A | * | 2/1982 | Briggs | F24H 3/0488 126/110 B |
| 4,341,017 A | * | 7/1982 | Janczak | B27B 17/0033 30/384 |
| 4,397,619 A | * | 8/1983 | Alliquander | E21B 4/02 418/48 |

(Continued)

*Primary Examiner* — Maged M Almawri
(74) *Attorney, Agent, or Firm* — W&G Law Group

(57) ABSTRACT

One of the objects of the present invention is to provide a linear vibration motor which enhances vibration performance. To achieve the above-mentioned object, the present invention provides a linear vibration motor having a housing body with an accommodation space; a vibration unit accommodated in the accommodation space; an elastic member suspending the vibration unit in the accommodation space; and a coil assembly fixed to the housing body for driving the vibration unit to vibrate. The vibration unit includes a magnet assembly having a plurality of first magnets arranged along a vibration direction of the vibration unit, and at least one second magnet sandwiched between two adjacent first magnets, for forming a magnetic circuit.

6 Claims, 4 Drawing Sheets

(56) References Cited

U.S. PATENT DOCUMENTS

| | | | | |
|---|---|---|---|---|
| 4,431,356 A * | 2/1984 | Lassota | F02F 11/00 | 418/58 |
| 4,431,387 A * | 2/1984 | Lassota | F02F 11/00 | 417/372 |
| 4,445,060 A * | 4/1984 | Ruhle | H02K 1/17 | 310/154.14 |
| 4,471,248 A * | 9/1984 | Smetana | F16F 15/124 | |
| 4,507,044 A * | 3/1985 | Hutchins | B25J 9/104 | 901/17 |
| 4,542,383 A * | 9/1985 | Cusey | H01Q 1/103 | 343/903 |
| 4,555,682 A * | 11/1985 | Gounji | H03H 9/562 | 333/186 |
| 4,567,555 A * | 1/1986 | Matsuse | H02M 5/4505 | 318/762 |
| 4,584,928 A * | 4/1986 | Haynes | F16F 1/50 | 248/603 |
| 4,591,868 A * | 5/1986 | Cusey | H01Q 1/103 | 343/903 |
| 4,632,372 A * | 12/1986 | Nakajima | F16F 13/20 | 267/140.11 |
| 4,632,642 A * | 12/1986 | Meister, III | H02K 5/24 | 417/423.2 |
| 4,639,905 A * | 1/1987 | Goodloe | G01V 1/155 | 367/75 |
| 4,697,581 A * | 10/1987 | Endo | A61H 23/0218 | 601/78 |
| 4,756,515 A * | 7/1988 | Kuroda | F16F 13/105 | 137/854 |
| 4,780,739 A * | 10/1988 | Kawakami | H04N 23/6811 | 348/208.99 |
| 4,800,965 A * | 1/1989 | Keller | B25D 17/043 | 267/140.13 |
| 4,810,207 A * | 3/1989 | Butterfield | H01R 13/621 | 439/529 |
| 4,813,532 A * | 3/1989 | Harper | B65G 27/32 | 198/767 |
| 4,819,330 A * | 4/1989 | Fenn | B26B 21/38 | 30/44 |
| 4,825,548 A * | 5/1989 | Driggers | B25F 5/026 | D8/8 |
| 4,826,305 A * | 5/1989 | Ogasawara | B60R 1/06 | 359/872 |
| 4,852,533 A * | 8/1989 | Doncker | F16F 9/103 | 123/190.17 |
| 4,888,543 A * | 12/1989 | Bleijenberg | G05B 19/4015 | 318/687 |
| 4,907,786 A * | 3/1990 | Okazaki | F16F 13/106 | 267/140.3 |
| 4,914,816 A * | 4/1990 | Fenn | B26B 21/38 | 30/535 |
| 4,921,229 A * | 5/1990 | Hori | F16F 13/14 | 384/220 |
| 4,941,544 A * | 7/1990 | Fischle | B60K 5/04 | 180/297 |
| 4,942,075 A * | 7/1990 | Hartel | F16F 1/426 | 428/113 |
| 4,965,513 A * | 10/1990 | Haynes | F16K 37/0083 | 73/1.72 |
| 4,986,401 A * | 1/1991 | Petzold | B60W 30/20 | 477/176 |
| 4,989,252 A * | 1/1991 | Nakanishi | G10K 11/17861 | 381/71.3 |
| 5,004,207 A * | 4/1991 | Ishikawa | G11B 33/121 | 267/141 |
| 5,111,697 A * | 5/1992 | Habermann | H02K 33/00 | 73/668 |
| 5,187,400 A * | 2/1993 | Kurata | H02K 3/525 | 310/49.12 |
| 5,193,788 A * | 3/1993 | Richter | F16F 3/12 | 267/152 |
| 5,214,851 A * | 6/1993 | Althaus | B26B 21/38 | 30/44 |
| 5,222,877 A * | 6/1993 | Benschop | F04B 35/045 | 417/435 |
| 5,231,337 A * | 7/1993 | van Namen | H02K 33/18 | 318/128 |
| 5,252,038 A * | 10/1993 | Mangyo | F04B 39/127 | 417/363 |
| 5,288,059 A * | 2/1994 | Gautheron | F16F 1/387 | 267/281 |
| 5,397,955 A * | 3/1995 | Takagi | H02N 2/08 | 310/323.03 |
| 5,529,295 A * | 6/1996 | Leibach | F16F 7/1011 | 188/267 |
| 5,543,956 A * | 8/1996 | Nakagawa | G02B 26/085 | 359/872 |
| 5,574,253 A * | 11/1996 | Golob | B26B 19/3853 | 206/349 |
| 5,699,865 A * | 12/1997 | Forderer | B27B 17/0033 | 267/269 |
| 5,771,490 A * | 6/1998 | Reynolds | F16F 9/0472 | 74/551.9 |
| 5,820,286 A * | 10/1998 | Karl | B60S 1/04 | 403/220 |
| 5,881,559 A * | 3/1999 | Kawamura | B60K 6/24 | 903/905 |
| 5,943,307 A * | 8/1999 | Takagi | G11B 7/0946 | 369/47.33 |
| 5,990,645 A * | 11/1999 | Nakamura | G05D 19/02 | 318/128 |
| 6,057,554 A * | 5/2000 | Plesko | H03K 17/955 | 250/221 |
| 6,107,706 A * | 8/2000 | Neckermann | F16F 15/08 | 310/43 |
| 6,115,337 A * | 9/2000 | Takagi | G11B 20/10527 | 369/47.33 |
| 6,218,767 B1* | 4/2001 | Akada | H02N 2/0085 | 310/323.02 |
| 6,323,568 B1* | 11/2001 | Zabar | H02K 33/04 | 310/12.24 |
| 6,413,117 B1* | 7/2002 | Annerino | H01R 12/7076 | 439/500 |
| 6,731,187 B2* | 5/2004 | Kurihara | H03H 9/0514 | 333/192 |
| 7,193,346 B2* | 3/2007 | Kim | H02K 7/061 | 310/81 |
| 7,355,305 B2* | 4/2008 | Nakamura | H02K 33/06 | 310/36 |
| 7,382,510 B2* | 6/2008 | Yoda | H02N 1/006 | 310/309 |
| 7,518,287 B2* | 4/2009 | Hirasawa | H10N 30/2045 | 310/323.02 |
| 7,671,493 B2* | 3/2010 | Takashima | G06F 3/016 | 310/15 |
| 7,911,098 B2* | 3/2011 | Lee | H02K 33/16 | 310/20 |
| 7,999,421 B2* | 8/2011 | Kim | H02K 33/18 | 310/15 |
| 8,222,782 B2* | 7/2012 | Saito | H02K 7/063 | 310/68 B |
| 8,237,314 B2* | 8/2012 | Lee | H02K 33/18 | 310/15 |
| 8,269,379 B2* | 9/2012 | Dong | H02K 33/16 | 310/28 |
| 8,278,786 B2* | 10/2012 | Woo | H02K 33/16 | 310/15 |
| 8,288,898 B2* | 10/2012 | Jun | H02K 33/16 | 310/34 |
| 8,368,268 B2* | 2/2013 | Hasegawa | G02B 21/24 | 359/381 |
| 8,400,027 B2* | 3/2013 | Dong | H02K 33/16 | 310/25 |
| 8,461,969 B2* | 6/2013 | An | H02K 33/06 | 318/132 |
| 8,587,162 B2* | 11/2013 | Kagami | A61C 17/32 | 310/38 |

(56) References Cited

U.S. PATENT DOCUMENTS

| | | | | |
|---|---|---|---|---|
| 8,624,449 B2* | 1/2014 | Kim | H02K 33/16 | 310/28 |
| 8,624,450 B2* | 1/2014 | Dong | H02K 33/16 | 310/20 |
| 8,643,229 B2* | 2/2014 | Park | H02K 33/16 | 310/15 |
| 8,648,502 B2* | 2/2014 | Park | H02K 33/16 | 310/15 |
| 8,749,113 B2* | 6/2014 | Masunaga | H02N 1/006 | 310/40 MM |
| 8,766,494 B2* | 7/2014 | Park | H02K 35/02 | 310/25 |
| 8,829,741 B2* | 9/2014 | Park | B06B 1/045 | 310/25 |
| 8,836,189 B2* | 9/2014 | Lee | H02K 7/085 | 310/90 |
| 8,878,401 B2* | 11/2014 | Lee | H02K 33/16 | 310/15 |
| 8,941,272 B2* | 1/2015 | Hong | H02K 33/18 | 310/15 |
| D726,795 S* | 4/2015 | Huang | D15/147 | |
| 9,024,489 B2* | 5/2015 | Akanuma | H02K 33/16 | 310/15 |
| 9,048,718 B2* | 6/2015 | Zhang | H02K 33/18 | |
| 9,225,265 B2* | 12/2015 | Oh | G06F 3/016 | |
| 9,252,648 B2* | 2/2016 | Furukawa | H02K 7/1876 | |
| 9,306,429 B2* | 4/2016 | Akanuma | H02K 33/16 | |
| 9,312,744 B2* | 4/2016 | Akanuma | B06B 1/045 | |
| 9,467,033 B2* | 10/2016 | Jun | H02K 33/16 | |
| 9,543,816 B2* | 1/2017 | Nakamura | H02K 33/00 | |
| 9,553,497 B2* | 1/2017 | Kim | B06B 1/045 | |
| 9,614,425 B2* | 4/2017 | Jin | H02K 33/12 | |
| 9,748,827 B2* | 8/2017 | Dong | H02K 33/16 | |
| 9,762,110 B2* | 9/2017 | Wang | H02K 33/16 | |
| 9,831,415 B2* | 11/2017 | Park | B06B 1/14 | |
| 9,871,432 B2* | 1/2018 | Mao | H02K 33/16 | |
| 9,906,109 B2* | 2/2018 | Endo | H02K 33/16 | |
| 9,948,170 B2* | 4/2018 | Jun | H02K 33/00 | |
| 9,966,827 B2* | 5/2018 | Wang | H02K 33/16 | |
| 10,008,894 B2* | 6/2018 | Mao | H02K 1/34 | |
| 10,033,257 B2* | 7/2018 | Zhang | H02K 33/12 | |
| 10,038,360 B2* | 7/2018 | Wang | H02K 33/12 | |
| 10,063,128 B2* | 8/2018 | Wang | H02K 33/16 | |
| 10,160,010 B2* | 12/2018 | Chun | H02K 33/16 | |
| 10,236,761 B2* | 3/2019 | Wang | H02K 33/16 | |
| 10,307,791 B2* | 6/2019 | Xu | B06B 1/045 | |
| 10,328,461 B2* | 6/2019 | Xu | B06B 1/045 | |
| 10,447,133 B2* | 10/2019 | Jin | H02K 33/18 | |
| 10,483,451 B2* | 11/2019 | Wang | H10N 30/85 | |
| 10,486,196 B2* | 11/2019 | Chai | B06B 1/045 | |
| 10,491,090 B2* | 11/2019 | Zu | H02K 33/16 | |
| 10,547,233 B2* | 1/2020 | Jin | H02K 5/04 | |
| 10,596,594 B2* | 3/2020 | Ling | H02K 33/02 | |
| 10,596,596 B2* | 3/2020 | Ling | B06B 1/045 | |
| 10,674,278 B2* | 6/2020 | Zhou | H04R 9/025 | |
| 10,763,732 B2* | 9/2020 | Liu | H02K 33/18 | |
| 10,847,296 B2* | 11/2020 | Wauke | H01F 7/126 | |
| 10,886,827 B2* | 1/2021 | Liu | H02K 33/14 | |
| 11,050,334 B2* | 6/2021 | Mori | H02K 33/18 | |
| 11,205,937 B2* | 12/2021 | Song | H02K 5/24 | |
| 11,309,808 B1* | 4/2022 | Li | H02K 35/02 | |
| 2002/0109424 A1* | 8/2002 | Iwabuchi | H04R 9/06 | 310/81 |
| 2003/0094861 A1* | 5/2003 | Shimizu | H02K 33/10 | 310/36 |
| 2004/0169425 A1* | 9/2004 | Aihara | B06B 1/045 | 310/15 |
| 2006/0002577 A1* | 1/2006 | Won | B06B 1/045 | 381/396 |
| 2006/0028072 A1* | 2/2006 | Iwasa | H02K 33/00 | 310/12.25 |
| 2006/0066164 A1* | 3/2006 | Kim | H02K 7/063 | 310/81 |
| 2006/0133218 A1* | 6/2006 | Matthey | B06B 1/045 | 368/230 |
| 2008/0129130 A1* | 6/2008 | Mun | H02K 5/225 | 310/40 MM |
| 2009/0036807 A1* | 2/2009 | Habatjou | A61H 23/0263 | 601/134 |
| 2009/0096299 A1* | 4/2009 | Ota | B06B 1/045 | 310/25 |
| 2009/0243410 A1* | 10/2009 | Kleibl | B06B 1/166 | 405/232 |
| 2009/0267423 A1* | 10/2009 | Kajiwara | H02K 33/02 | 310/38 |
| 2010/0102646 A1* | 4/2010 | Masami | H02K 33/16 | 310/29 |
| 2010/0117607 A1* | 5/2010 | Mochida | H02K 7/1876 | 322/99 |
| 2010/0213773 A1* | 8/2010 | Dong | H02K 33/16 | 310/25 |
| 2010/0289357 A1* | 11/2010 | An | H02K 5/1677 | 310/81 |
| 2010/0302752 A1* | 12/2010 | An | H02K 33/06 | 361/807 |
| 2011/0006618 A1* | 1/2011 | Lee | B06B 1/045 | 310/25 |
| 2011/0018364 A1* | 1/2011 | Kim | H02K 33/18 | 310/20 |
| 2011/0018367 A1* | 1/2011 | Kim | B06B 1/045 | 310/25 |
| 2011/0062803 A1* | 3/2011 | Lee | H02K 33/18 | 310/29 |
| 2011/0068640 A1* | 3/2011 | Choi | H02K 5/04 | 310/25 |
| 2011/0074228 A1* | 3/2011 | Kim | H02K 33/16 | 310/29 |
| 2011/0074229 A1* | 3/2011 | Kim | H02K 15/14 | 310/29 |
| 2011/0089772 A1* | 4/2011 | Dong | H02K 33/16 | 310/25 |
| 2011/0101797 A1* | 5/2011 | Lee | H02K 33/16 | 310/29 |
| 2011/0101798 A1* | 5/2011 | Lee | H02K 33/16 | 310/29 |
| 2011/0115310 A1* | 5/2011 | Dong | H02K 33/16 | 310/28 |
| 2011/0115311 A1* | 5/2011 | Dong | H02K 33/16 | 310/28 |
| 2011/0133577 A1* | 6/2011 | Lee | H02K 33/18 | 310/15 |
| 2011/0156500 A1* | 6/2011 | Dong | H02K 33/16 | 310/25 |
| 2011/0169347 A1* | 7/2011 | Miyamoto | G06F 3/016 | 310/12.21 |
| 2011/0198945 A1* | 8/2011 | Nakagawa | H02K 33/16 | 310/12.25 |
| 2011/0203061 A1* | 8/2011 | Takahashi | H02K 33/18 | 310/38 |
| 2011/0227426 A1* | 9/2011 | Lee | H02K 33/18 | 310/25 |
| 2011/0241451 A1* | 10/2011 | Park | B06B 1/045 | 310/25 |
| 2011/0254782 A1* | 10/2011 | Park | B06B 1/045 | 345/173 |
| 2011/0266892 A1* | 11/2011 | Wauke | H02K 33/18 | 310/25 |
| 2011/0278960 A1* | 11/2011 | Jeon | B06B 1/045 | 310/25 |
| 2011/0316361 A1* | 12/2011 | Park | H02K 33/16 | 310/25 |
| 2012/0032535 A1* | 2/2012 | Park | H02K 35/02 | 310/25 |
| 2012/0049660 A1* | 3/2012 | Park | B06B 1/045 | 310/25 |
| 2012/0104875 A1* | 5/2012 | Park | H02K 33/16 | 310/25 |
| 2012/0108299 A1* | 5/2012 | Yang | H02K 33/16 | 455/567 |

(56) References Cited

U.S. PATENT DOCUMENTS

| | | | | |
|---|---|---|---|---|
| 2012/0112565 A1* | 5/2012 | Lee | H02K 33/16 | 310/20 |
| 2012/0153748 A1* | 6/2012 | Wauke | H02K 33/16 | 310/25 |
| 2012/0169148 A1* | 7/2012 | Kim | H02K 33/16 | 310/25 |
| 2012/0169151 A1* | 7/2012 | Dong | H02K 33/16 | 310/25 |
| 2012/0170792 A1* | 7/2012 | Li | H04R 9/066 | 381/412 |
| 2012/0187780 A1* | 7/2012 | Bang | H02K 33/16 | 310/25 |
| 2012/0313459 A1* | 12/2012 | Zhang | H02K 33/18 | 310/25 |
| 2012/0319506 A1* | 12/2012 | Shim | H02K 33/16 | 310/25 |
| 2013/0061736 A1* | 3/2013 | Wauke | G10H 1/42 | 84/736 |
| 2013/0099600 A1* | 4/2013 | Park | B06B 1/045 | 310/15 |
| 2013/0099602 A1* | 4/2013 | Park | H02K 33/16 | 310/25 |
| 2013/0119787 A1* | 5/2013 | Yu | B06B 1/045 | 310/25 |
| 2013/0134804 A1* | 5/2013 | Kim | B06B 1/045 | 310/25 |
| 2013/0169072 A1* | 7/2013 | Oh | H02K 33/16 | 310/36 |
| 2013/0229070 A1* | 9/2013 | Akanuma | H02K 33/00 | 310/25 |
| 2013/0241321 A1* | 9/2013 | Akanuma | B06B 1/045 | 310/25 |
| 2013/0285479 A1* | 10/2013 | Kinoshita | H02K 35/02 | 310/12.12 |
| 2014/0035397 A1* | 2/2014 | Endo | H02K 33/18 | 310/30 |
| 2014/0062224 A1* | 3/2014 | Kim | H02K 33/16 | 310/15 |
| 2014/0152126 A1* | 6/2014 | Kim | B06B 1/045 | 310/25 |
| 2014/0152148 A1* | 6/2014 | Oh | B06B 3/00 | 310/321 |
| 2014/0219494 A1* | 8/2014 | Kim | H04R 9/046 | 381/400 |
| 2014/0306556 A1* | 10/2014 | Kim | H02K 33/16 | 310/25 |
| 2015/0015117 A1* | 1/2015 | Lee | B06B 1/04 | 310/20 |
| 2015/0070792 A1* | 3/2015 | Terajima | G02B 7/08 | 359/824 |
| 2015/0086066 A1* | 3/2015 | Yan | H04R 9/025 | 381/412 |
| 2015/0123498 A1* | 5/2015 | Yang | H02K 33/16 | 310/25 |
| 2015/0137627 A1* | 5/2015 | Katada | H02K 33/16 | 310/25 |
| 2015/0137628 A1* | 5/2015 | Endo | H02K 33/16 | 310/25 |
| 2015/0181344 A1* | 6/2015 | Jiang | H04R 31/006 | 381/400 |
| 2015/0194870 A1* | 7/2015 | Kim | H02K 33/18 | 310/25 |
| 2015/0328664 A1* | 11/2015 | Kim | B06B 1/0644 | 310/323.01 |
| 2016/0164389 A1* | 6/2016 | Jang | H02K 7/116 | 310/20 |
| 2016/0173990 A1* | 6/2016 | Park | H04R 9/043 | 381/354 |
| 2016/0192075 A1* | 6/2016 | Shibata | H02K 33/18 | 310/28 |
| 2016/0198262 A1* | 7/2016 | Wang | H04R 7/18 | 381/392 |
| 2016/0218607 A1* | 7/2016 | Oh | H02K 33/16 | |
| 2016/0254736 A1* | 9/2016 | Jin | H02K 33/16 | 310/25 |
| 2016/0336842 A1* | 11/2016 | Chun | H02K 33/16 | |
| 2016/0381462 A1* | 12/2016 | Wang | H04R 9/06 | 381/400 |
| 2017/0012515 A1* | 1/2017 | Xu | H02K 35/02 | |
| 2017/0012517 A1* | 1/2017 | Huang | H02K 33/00 | |
| 2017/0019011 A1* | 1/2017 | Wang | H02K 33/16 | |
| 2017/0033653 A1* | 2/2017 | Wang | H02K 33/16 | |
| 2017/0033657 A1* | 2/2017 | Mao | H02K 33/16 | |
| 2017/0033664 A1* | 2/2017 | Xu | H02K 33/18 | |
| 2017/0033669 A1* | 2/2017 | Xu | H02K 33/16 | |
| 2017/0104401 A1* | 4/2017 | Umehara | H02K 33/06 | |
| 2017/0110920 A1* | 4/2017 | Mao | H02K 1/34 | |
| 2017/0110947 A1* | 4/2017 | Mao | H02K 7/12 | |
| 2017/0214306 A1* | 7/2017 | Katada | H02K 33/16 | |
| 2017/0222535 A1* | 8/2017 | Baek | H02K 11/30 | |
| 2017/0250596 A1* | 8/2017 | Son | H02K 1/34 | |
| 2017/0288519 A1* | 10/2017 | Kim | H02K 33/00 | |
| 2018/0021812 A1* | 1/2018 | Akanuma | H02K 33/00 | 310/25 |
| 2018/0056329 A1* | 3/2018 | Akanuma | H02K 33/16 | |
| 2018/0166961 A1* | 6/2018 | Guo | H02K 33/18 | |
| 2018/0166965 A1* | 6/2018 | Mao | H02K 33/16 | |
| 2018/0241295 A1* | 8/2018 | Zu | H02K 33/14 | |
| 2018/0250107 A1* | 9/2018 | Dai | H02K 1/2791 | |
| 2019/0044425 A1* | 2/2019 | Zu | H02K 33/02 | |
| 2019/0151895 A1* | 5/2019 | Takahashi | H02K 33/18 | |
| 2019/0206601 A1* | 7/2019 | Wauke | B06B 1/045 | |
| 2019/0356208 A1* | 11/2019 | Okayasu | B06B 1/045 | |
| 2020/0044537 A1* | 2/2020 | Huang | H02K 33/16 | |
| 2020/0044544 A1* | 2/2020 | Tang | H02K 33/16 | |
| 2020/0212775 A1* | 7/2020 | Tang | H02K 33/16 | |
| 2020/0212776 A1* | 7/2020 | Ling | H02K 33/16 | |
| 2021/0194342 A1* | 6/2021 | Kitahara | H02K 33/16 | |

* cited by examiner

LINEAR VIBRATION MOTOR

FIELD OF THE PRESENT DISCLOSURE

The present disclosure relates to motors, in particular to a linear vibration motor for providing tactile feedback.

DESCRIPTION OF RELATED ART

With the development of electronic technology, portable consumer electronic products, such as mobile phones, handheld game consoles, navigation devices, or handheld multimedia entertainment devices, are becoming more and more popular. These electronic products generally use linear vibration motor for system feedback, such as mobile phone call prompts, information prompts, navigation prompts, and vibration feedback of game consoles. Such a wide range of applications requires the vibration motor to have good vibration performance.

In the linear vibration motor of a related art, the internal magnetic circuit setting is unreasonable. The magnetic field strength is not enough, causing the vibration of the linear vibration motor to weaken. As a result, the vibration performance of the linear vibration motor is affected and deteriorated.

Therefore, it is necessary to provide a new linear vibration motor to solve the above-mentioned problems.

SUMMARY OF THE PRESENT INVENTION

One of the objects of the present invention is to provide a linear vibration motor which enhances vibration performance.

To achieve the above-mentioned objects, the present invention provides a linear vibration motor having a housing body with an accommodation space; a vibration unit accommodated in the accommodation space; an elastic member suspending the vibration unit in the accommodation space; and a coil assembly fixed to the housing body for driving the vibration unit to vibrate. The vibration unit includes a magnet assembly having a plurality of first magnets arranged along a vibration direction of the vibration unit, and at least one second magnet sandwiched between two adjacent first magnets, for forming a magnetic circuit.

The first magnet is magnetized in a direction perpendicular to the vibration direction; the second magnet is magnetized along the vibration direction; the magnetizing directions of two adjacent first magnets are opposite to each other.

In addition, a direction of a magnetic field generated by the second magnet is same to a direction of the magnetic field of force generated by the first magnet.

In addition, the first magnet is a ring magnet, and the first magnet is magnetized in a radial direction.

In addition, the second magnet is a ring magnet, and the second magnet is magnetized in an axial direction.

In addition, the vibration unit further includes a weight in the second magnet, and a circular connector set on both sides of the magnet assembly along the vibration direction; the magnet assembly is connected to the elastic member through the circular connector.

In addition, the circular connector includes a body part, a connection part extending from the body part to the elastic member by soldering, and a first positioning column extending from the body part toward the first magnet; the first magnet includes a positioning hole penetrating the first magnet in an axial direction for engaging with the positioning column thereby positioning and fixing the connecting ring and the first magnet.

In addition, the weight has a second positioning column extending in a direction toward the first magnet and received in the positioning hole thereby positioning and fixing the weight and the first magnet.

In addition, the coil assembly includes a first coil and a second coil arranged along the vibration direction; the first coil and the second coil are respectively arranged around the first magnet with different magnetization directions; a current direction of the first coil and the second coil are opposite to each other.

In addition, the housing body includes a magnetic conductive ring arranged on an outside of the coil along a vibration direction perpendicular to the vibration unit.

In addition, the housing body, the vibration unit, the coil assembly and the elastic member are coaxially assembled.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Figure 1:
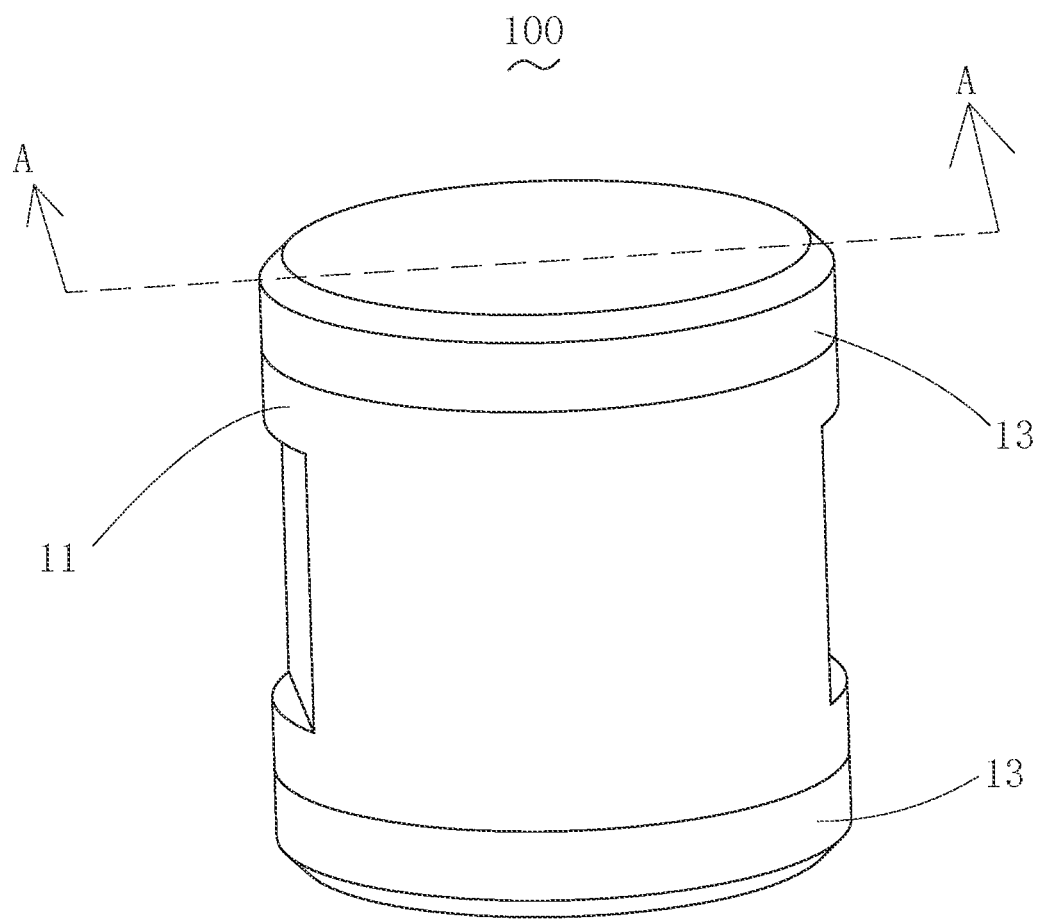
FIG. 1 is an isometric view of a linear vibration motor in accordance with an exemplary embodiment of the present invention.
Figure 2:
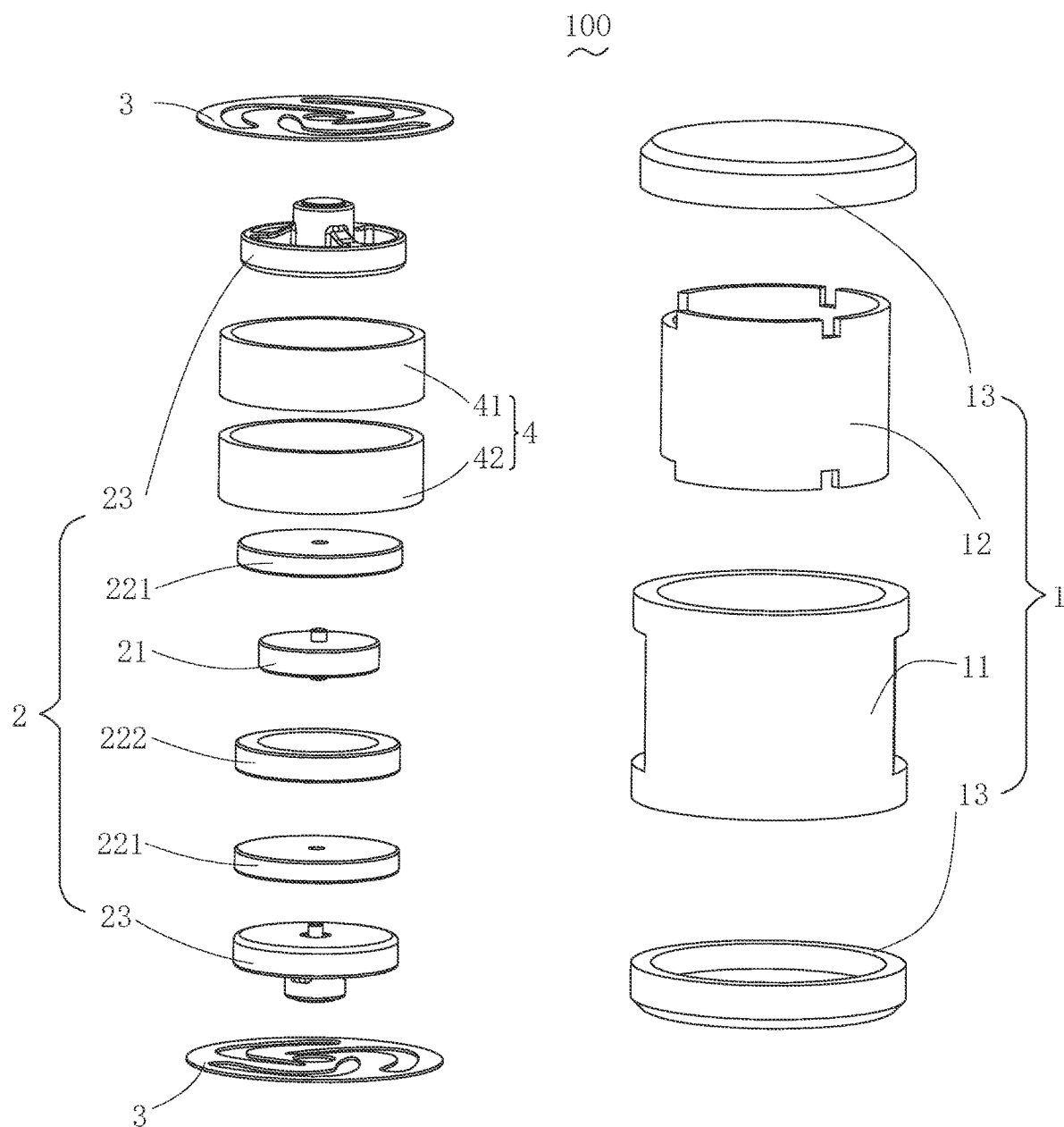
FIG. 2 is an exploded and isometric view of the linear vibration motor.
Figure 3:
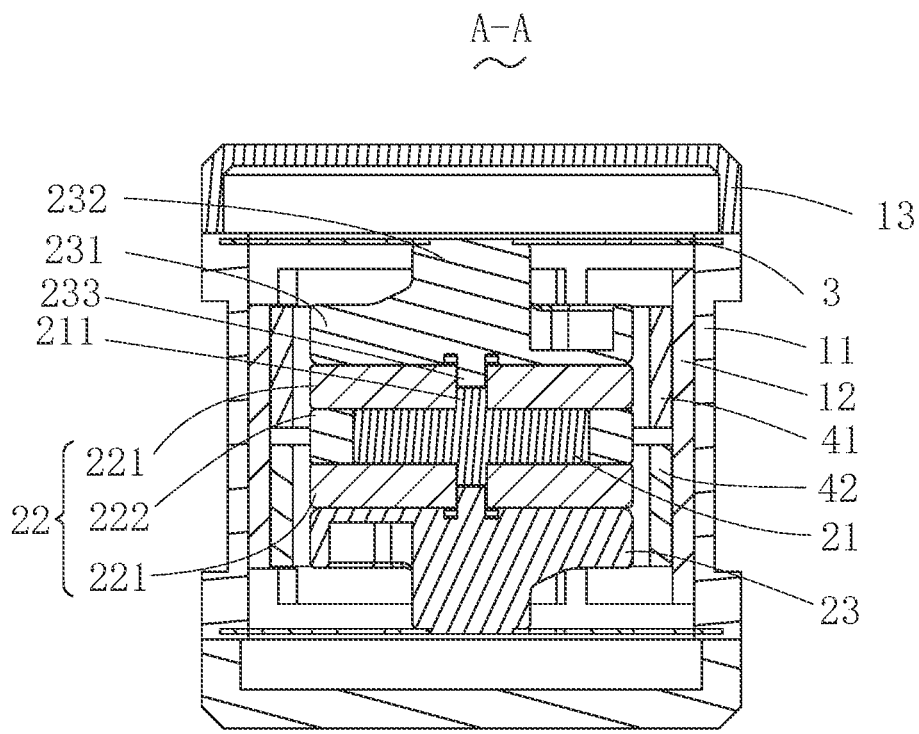
FIG. 3 is a cross-sectional view of the linear vibration motor taken along line AA in FIG. 1.

Please refer to FIGS. 1-3. the present invention provides a linear vibration motor 100, which includes a housing body 1 with an accommodation space 10 and a vibration unit 2 accommodated in the accommodation space 10, an elastic member 3 which suspends the vibration unit 2 in the accommodation space 10, and a coil assembly 4 fixed to the housing body 1 and driving the vibration unit 2 to vibrate. The housing body 1, the vibration unit 2, the coil assembly 4, and the elastic member 3 are coaxially arranged.

The housing body 1 includes a cylindrical housing body 11, and a permeable ring 12 that is coaxially arranged with the housing body 11 and attached to the inner side of the housing body 11, a cover 13 connected to and covering both ends of the housing body. The housing body 11 and the cover 13 jointly enclose the accommodation space 10. The coil assembly 4 includes a first coil 41 and a second coil 42 arranged along the vibration direction of the vibration unit 2. The first coil 41 and the second coil 42 are fixedly connected to a side of the permeable ring 12 away from the housing body 1. The permeable ring 12 is made of a magnetically conductive material. With this arrangement, the magnetic field utilization rate of the internal magnetic field of the linear motor can be improved, therefore, the driving force of the linear vibration motor 100 provided by the present invention is improved. In other optional manners, the permanent ring 12 may not be set. However, if the housing body 11 is made of a magnetically conductive material, the utilization rate of the magnetic field can also be improved, and the utilization rate of the internal space of the linear vibration motor 100 can also be improved.

The vibration unit 2 includes a weight 21, a magnet assembly 22 wrapped around the weight 21, and a circular connector 23 connecting the magnet assembly 22 and the elastic member 2. The magnet assembly 22 includes two ring-shaped first magnets 221 and a ring-shaped second magnet 222 sandwiched between the two first magnets 221. The weight 21 is accommodated in the second magnet 222. The first magnet 221 sandwiched on both sides of the second magnet 222 is enclosed in the magnet assembly 22. With such a configuration, the vibration intensity of the linear vibration motor 100 is enhanced by the weight 21. Moreover, since the weight 21 is accommodated in the magnet assembly 22, the utilization rate of the internal design space of the linear vibration motor 100 is improved, thereby increasing the vibration stroke of the vibration unit 2. In other optional embodiments, the first magnet 221 includes three or more first magnets 221 arranged at intervals, and a second magnet 222 sandwiched between the plurality of first magnets 221. The circular connector 23 includes a body part 231, and a connection part 232 extending from the body part 231 to the elastic member 3 and welded and fixed to the elastic member 3, and a first positioning column 233 extending from the body part 231 to the direction of the first magnet 221. The first magnet 221 includes a positioning hole 2210 penetrating the first magnet 221 in an axial direction. The first positioning column 233 is inserted into the positioning hole 2210 to realize the positioning and fixing function of the circular connector 23 and the first magnet 221. The weight 21 is provided with a second positioning column 211 extending along the direction toward the first magnet 221. The second positioning column 211 is inserted into the positioning hole 2210 to realize the positioning and fixing effect of the weight 21 and the first magnet 221. The first positioning column 233, the second positioning column 211, and the positioning hole 2210 are provided, and through the coordination of the three, the vibration unit of the linear vibration motor 100 of the present invention is easier to assemble and position, and the bonding strength is improved.

Figure 4:
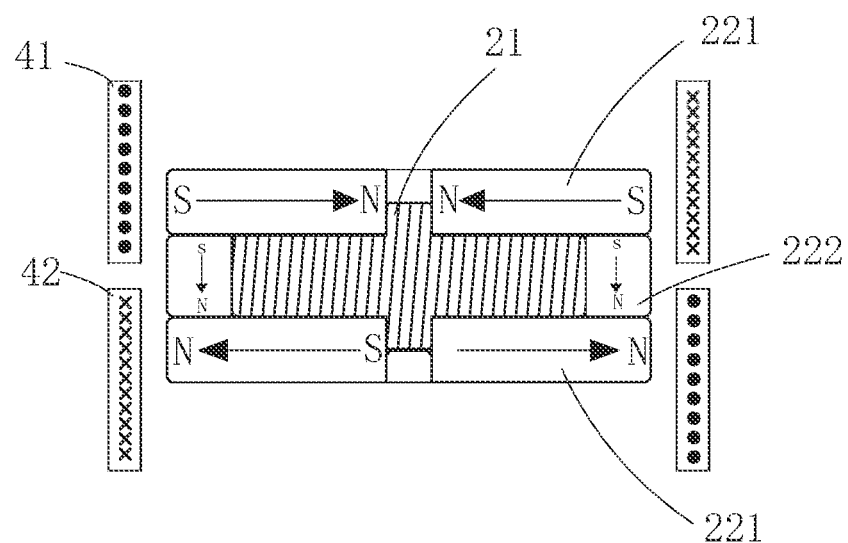
FIG. 4 illustrates the linear vibration motor vibrating along a direction.
Figure 5:
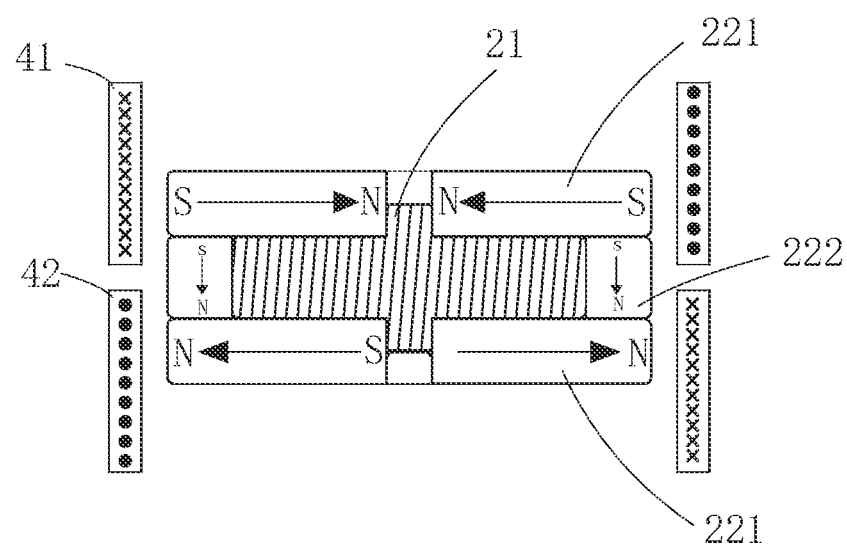
FIG. 5 illustrates the linear vibration motor vibrating along another direction.

As shown in FIGS. 4-5, the two first magnets 221 are magnetized along the radial direction. The second magnet 222 is magnetized in the axial direction. And the magnetizing directions of the two adjacent first magnets 221 are opposite. The first magnet 221 and the second magnet 222 jointly form a magnetic circuit. This configuration can greatly increase the magnetic field strength of the linear vibration motor 100. Thereby, the driving force of vibration is improved, and the vibration feeling of linear vibration motor 100 is enhanced. In this embodiment, one of the first magnets 221 is S pole on the inner side in the radial direction, and N pole on the outer side in the radial direction. The inner side of the other adjacent first magnet in the radial direction is N pole, and the outer side in the radial direction is S pole. One side of the second magnet 222 along the axial direction is arranged as N pole, and the other side is arranged as S pole. The magnetic field lines of the second magnet 222 have the same direction as the magnetic field lines generated by the first magnet. The magnetic field strength of the magnetic circuit formed by the first magnet can be strengthened by the second magnet 222. That is, the first magnet and the second magnet together form a magnetic circuit.

As shown in FIG. 4, the first coil 41 and the second coil 42 are arranged along the vibration direction of the vibration unit 2. Moreover, the energization directions of the first coil 41 and the second coil 42 are opposite. When the linear vibration motor 100 is working, according to the left-hand rule of ampere force, as the power direction shown in FIG. 4, the first coil 41 and the second coil 42 are both subjected to downward ampere force. Furthermore, the vibration unit 2 is driven to move upward according to the principle of opposite force and reaction force. Similarly, when the energization direction of the coil assembly 4 changes as shown in FIG. 5, the vibration unit 2 is driven downward by the first coil 41 and the second coil 42 to move downward, and so on. So as to realize the vibration function of linear vibration motor 100. Therefore, the first coil 41 and the second coil 42 can always generate driving force in the same direction to the vibration unit 2 when energized, thereby increasing the driving force of the linear vibration motor.

In the linear vibration motor 100 of the present invention, the magnetizing direction of the magnet assembly 22 is reasonably set, so that the first magnet 221 and the second magnet 222 jointly form a magnetic circuit. The linear vibration motor 100 provided by the present invention has a reasonable internal magnetic circuit structure to increase the magnetic field intensity and increase the magnetic induction intensity. The magnetic flux is correspondingly increased, thereby optimizing the vibration performance of the linear vibration motor 100.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, including: a housing body with an accommodation space; a vibration unit accommodated in the accommodation space, including a magnet assembly having a plurality of first magnets arranged along a vibration direction of the vibration unit, and at least one second magnet sandwiched between two adjacent first magnets, for forming a magnetic circuit; an elastic member suspending the vibration unit in the accommodation space; a coil assembly fixed to the housing body for driving the vibration unit to vibrate; wherein the first magnet is magnetized in a direction perpendicular to the vibration direction; the second magnet is magnetized along the vibration direction; the magnetizing directions of two adjacent first magnets are opposite to each other, wherein, a direction of a magnetic field generated by the second magnet is same to a direction of the magnetic field of force generated by the first magnet, the first magnet is a ring magnet, and the first magnet is magnetized in a radial direction, the second magnet is a ring magnet, and the second magnet is magnetized in an axial direction, wherein, the vibration unit further includes a weight in the second magnet, and a circular connector set on both sides of the magnet assembly along the vibration direction; the magnet assembly is connected to the elastic member through the circular connector.

2. The linear vibration motor as described in claim 1, wherein, the coil assembly includes a first coil and a second coil arranged along the vibration direction; the first coil and the second coil are respectively arranged around the first magnet with different magnetization directions; a current direction of the first coil and the second coil are opposite to each other.

3. The linear vibration motor as described in claim 1, wherein, the housing body includes a magnetic conductive ring arranged on an outside of the coil along a vibration direction perpendicular to the vibration unit.

4. The linear vibration motor as described in claim 1, wherein, the housing body, the vibration unit, the coil assembly and the elastic member are coaxially assembled.

5. The linear vibration motor as described in claim 1, wherein, the circular connector includes a body part, a connection part extending from the body part to the elastic member by soldering, and a first positioning column extending from the body part toward the first magnet; the first magnet includes a positioning hole penetrating the first magnet in an axial direction for engaging with the positioning column thereby positioning and fixing the connecting ring and the first magnet.

6. The linear vibration motor as described in claim 5, wherein, the weight has a second positioning column extending in a direction toward the first magnet and received in the positioning hole thereby positioning and fixing the weight and the first magnet.

\* \* \* \* \*